US008938689B2

(12) United States Patent
Kilgore et al.

(10) Patent No.: US 8,938,689 B2
(45) Date of Patent: Jan. 20, 2015

(54) WINDOW SUPPRESSION

(75) Inventors: Andrew D. J. Kilgore, Angus (GB);
Euan W. Pattullo, Perthshire (GB);
Andrew C. Mellor, Perthshire (GB)

(73) Assignee: NCR Corporation, Duluth, GA (US)

( * ) Notice: Subject to any disclaimer, the term of this patent is extended or adjusted under 35 U.S.C. 154(b) by 434 days.

(21) Appl. No.: 12/749,886

(22) Filed: Mar. 30, 2010

(65) Prior Publication Data
US 2011/0246812 A1 Oct. 6, 2011

(51) Int. Cl.
*G06F 3/048* (2013.01)
*G06F 9/44* (2006.01)

(52) U.S. Cl.
CPC .............. *G06F 9/4443* (2013.01); *G06F 9/442* (2013.01)
USPC ........... 715/808; 715/806; 708/165; 719/314; 719/318; 719/330

(58) Field of Classification Search
CPC ................ G06F 21/51–21/552; G06F 21/566; G06F 9/546; G06F 3/048; G06F 9/4421–9/4425; G06F 9/4443; G06F 11/3636
USPC .................................... 715/808; 717/127–130
See application file for complete search history.

(56) References Cited

U.S. PATENT DOCUMENTS

| 5,574,854 | A * | 11/1996 | Blake et al. ..................... 714/28 |
| 5,909,215 | A * | 6/1999 | Berstis et al. .................. 715/781 |
| 2001/0021183 | A1* | 9/2001 | Baucke et al. ................. 370/351 |
| 2003/0101242 | A1* | 5/2003 | Cowden et al. ............... 709/220 |
| 2006/0150256 | A1* | 7/2006 | Fanton et al. .................... 726/27 |
| 2007/0072661 | A1* | 3/2007 | Lototski ............................. 463/1 |
| 2007/0192734 | A1* | 8/2007 | Berstis et al. .................. 715/808 |
| 2007/0214429 | A1* | 9/2007 | Lyudovyk et al. ............ 715/772 |
| 2007/0294627 | A1* | 12/2007 | Sauve et al. ................... 715/760 |
| 2010/0023750 | A1* | 1/2010 | Tan ................................ 713/150 |
| 2010/0100831 | A1* | 4/2010 | Whytock et al. .............. 715/764 |
| 2011/0035697 | A1* | 2/2011 | Rempel et al. ................ 715/781 |
| 2011/0078625 | A1* | 3/2011 | Mumford et al. ............. 715/804 |

FOREIGN PATENT DOCUMENTS

WO    WO 02103493 A2 * 12/2002

OTHER PUBLICATIONS

Borland, Windows API Reference Guide, 1991, Borland International, vol. 1, p. 19, 41, 646, 657.*
Charles Petzold, "Programming Windows", Nov. 11, 1998, Microsfot Press, Fifth Edition, p. 1270.*

(Continued)

*Primary Examiner* — William Bashore
*Assistant Examiner* — Linda Huynh
(74) *Attorney, Agent, or Firm* — Joseph P. Merhle (57) ABSTRACT

A method of suppressing unwanted windows created by an operating system is described. The method comprises: monitoring calls from the operating system relating to creation of a window and ascertaining if a monitored call relates to creation of a window of a type corresponding to a window type to be blocked. If the window is not of a type that is to be blocked, then the method involves displaying the window. If the window is of a type that is to be blocked, then the method involves: registering a new window procedure for that window; and returning an error message to the operating system using the new window procedure to suppress display of the window.

16 Claims, 4 Drawing Sheets

(56) References Cited

OTHER PUBLICATIONS

Microsoft, Windows API specification for WM_CREATE, snapshot on Nov. 27, 2012, Micrfost MSDN.*

Ivanov, Ivo. (2002). API Hooking revealed. The Code Project. Retrieved Dec. 22, 2007 from http://www.codeproject.com|system|hooksys. asp.*

* cited by examiner

WINDOW SUPPRESSION

FIELD OF INVENTION

The present invention relates to automatic window suppression, particularly, though not exclusively, in a self-service environment.

BACKGROUND OF INVENTION

Self-service terminals (SSTs) are public access devices that provide goods and/or services to customers in an unattended environment and/or in an unassisted manner. To operate effectively in an unassisted manner, it is essential for an SST to be able to recover from any faults that arise without requiring any action to be taken by the customers of that SST, and without displaying any error messages to the customers.

Most, if not all, SSTs use a graphical user interface (GUI). Many SSTs rely on a conventional operating system to support the GUI. A common operating system used by SSTs is one of the Microsoft (trade mark) Windows (trade mark) suite of operating systems (such as XP (trade mark) or NT (trade mark)). These operating systems are available from Microsoft Corporation.

One problem that can arise with Windows operating systems is that when an error occurs, the operating system presents a new window pane overlying the current window pane to describe the error. This new window pane is typically smaller than the current window pane, and is typically referred to as a dialog box (or a pop-up box).

For personal computers, the appearance of a pop-up box is not problematic because the user typically clicks an "OK" or "Cancel" button on the pop-up box to dismiss the pop-up box. However, in an unattended environment, there is no-one who can click on the pop-up box. Even if a customer is present, there may be no mouse or other pointing device to enable the customer to click on the pop-up box.

It would be advantageous to be able to ensure that pop-up boxes are not presented to customers in a self-service environment.

At present, operating system registry settings are used to prevent pop-up boxes, but these are only effective against some types of errors.

Some self-service applications (that is, software on the SST that provides transactions to a customer) use structured exception handling to ensure that pop-up boxes are suppressed. However, some programming languages, such as Visual Basic 6 (VB6), do not support structured exception handling. This means that if software components that use structured exception handling, such as some dynamic linked libraries (DLLs), initiate an exception then the operating system may present a pop-up box in response to this exception.

SUMMARY OF INVENTION

Accordingly, the invention generally provides methods, systems, apparatus, and software for suppressing unwanted windows, such as pop-up boxes.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of suppressing unwanted windows created by an operating system, the method comprising:

(i) monitoring calls from the operating system relating to creation of a window;

(ii) ascertaining if a monitored call relates to creation of a window of a type corresponding to a window type listed as blocked;

(iii) displaying the window in the event that the monitored call does not relate to a window of a type corresponding to a window type listed as blocked; and (iv) if the monitored call does relate to a window of a type corresponding to a window type listed as blocked then
   (a) registering a new window procedure for that window; and
   (b) returning an error message to the operating system using the new window procedure to suppress display of the window.

The method may further comprise the step of (iv) (b-1) adding an entry to an operating system event log to indicate that a window has been suppressed prior to returning an error message to the operating system.

The new window procedure may also be referred to as an alternative window procedure.

The window may be a window created in response to a WM_CREATE message, or in response to a combination of a WM_CREATE message then a WM_INITDIALOG message.

The method may comprise the further step of initiating a closure instruction for the operating system prior to returning an error message to the operating system using the new procedure to suppress display of the window.

The step of adding an entry to an operating system event log to indicate that a window has been suppressed may include storing information relating to (x) a title of the window that was suppressed, and (y) any text that was to be displayed in the suppressed window.

The step of monitoring calls from the operating system relating to creation of a window may involve using a monitoring service to register a global hook.

The global hook may monitor calls relating to creation of a window using a WM_CREATE message. The global hook may also monitor calls relating to creation of a window using a WM_INITDIALOG message.

The step of returning an error message to the operating system using the new procedure to suppress display of the window may be implemented by the new procedure returning a negative value to indicate to the operating system that an error has occurred in processing the WM_CREATE or WM_INITDIALOG message.

The step of ascertaining if a monitored call relates to creation of a window of a type corresponding to a window type listed as blocked may involve: (a)

inspecting a title and/or a class associated with that window and comparing the inspected title and/or class with stored titles and/or classes that are to be blocked, where the window is to be created using a WM_CREATE message; and (b)

classifying the monitored call as relating to creation of a window of a type corresponding to a window type listed as blocked, where the window is to be created using a WM_INITDIALOG message. In other words, when the monitored call includes a WM_INITDIALOG message (in addition to the WM_CREATE message), the monitored call is automatically classified as relating to a window that is to be blocked; whereas, when the monitored call only includes a WM_CREATE message, the monitored call is only classified as relating to a window that is to be blocked if the window has a class and/or title matching those on a stored block list.

The step of initiating a closure instruction for the operating system may comprise: initiating a shut-down of the operating system, initiating a re-boot of the operating system, or the like.

The step of registering a new window procedure for that window may include updating a window class table (also referred to as a windows handle table) with a pointer to an address at which the new window procedure can be accessed.

It should now be appreciated that this aspect has the advantage that unwanted pop-up dialog boxes and unwanted windows (other than pop-up dialog boxes) can be suppressed by using a new window procedure for those unwanted pop-up dialog boxes and unwanted windows (other than dialog boxes). A single new window procedure may be used to suppress unwanted windows and also all dialog boxes. Since only those windows (other than dialog boxes) recorded on the block list are suppressed, this enables desired windows to be displayed, and undesired windows (including all dialog boxes) to be suppressed.

According to a second aspect there is provided a computer program that, when executed, performs the method steps of the first aspect.

According to a third aspect there is provided a computer readable medium tangibly embodying the computer program of the second aspect.

According to a fourth aspect there is provided a self-service terminal comprising: a display; a processor; and a storage device operable to store instructions that when executed by the processor implements the method according to the first aspect.

The self-service terminal may include a token reader, such as a card reader. The terminal may be operable to instruct the card reader to return a customer's card (for example, via an XFS command) prior to returning an error message to the operating system.

According to a fifth aspect there is provided a method of suppressing unwanted windows created by an operating system, the method comprising:

(i) monitoring calls from the operating system relating to creation of a dialog box;

(ii) in response to detecting a call relating to creation of a dialog box, registering a new window procedure for a dialog box;

(iii) initiating a closure instruction for the operating system; and (iv) returning an error message to the operating system using the new procedure to suppress display of the dialog box.

The method may further comprise the step of adding an entry to an operating system event log to indicate that a dialog box has been suppressed prior to returning the error message to the operating system.

According to a sixth aspect there is provided a computer program for suppressing unwanted windows created by an operating system, the computer program comprising:

(i) a global hook arranged to: (a) monitor calls from the operating system relating to creation of a window, (b) ascertain if the monitored call relates to a window of a type corresponding to a window type to be blocked, and (c) register an alternative window procedure for that window; and (ii) an alternative window procedure arranged to return an error message to the operating system to suppress display of the window.

The alternative window procedure may be further arranged to initiate a closure instruction for the operating system prior to returning an error message to the operating system.

The alternative window procedure may be further arranged to add an entry to an operating system event log to indicate that a window has been suppressed prior to returning an error message to the operating system.

The alternative window procedure may be provided as a dynamic link library (DLL).

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
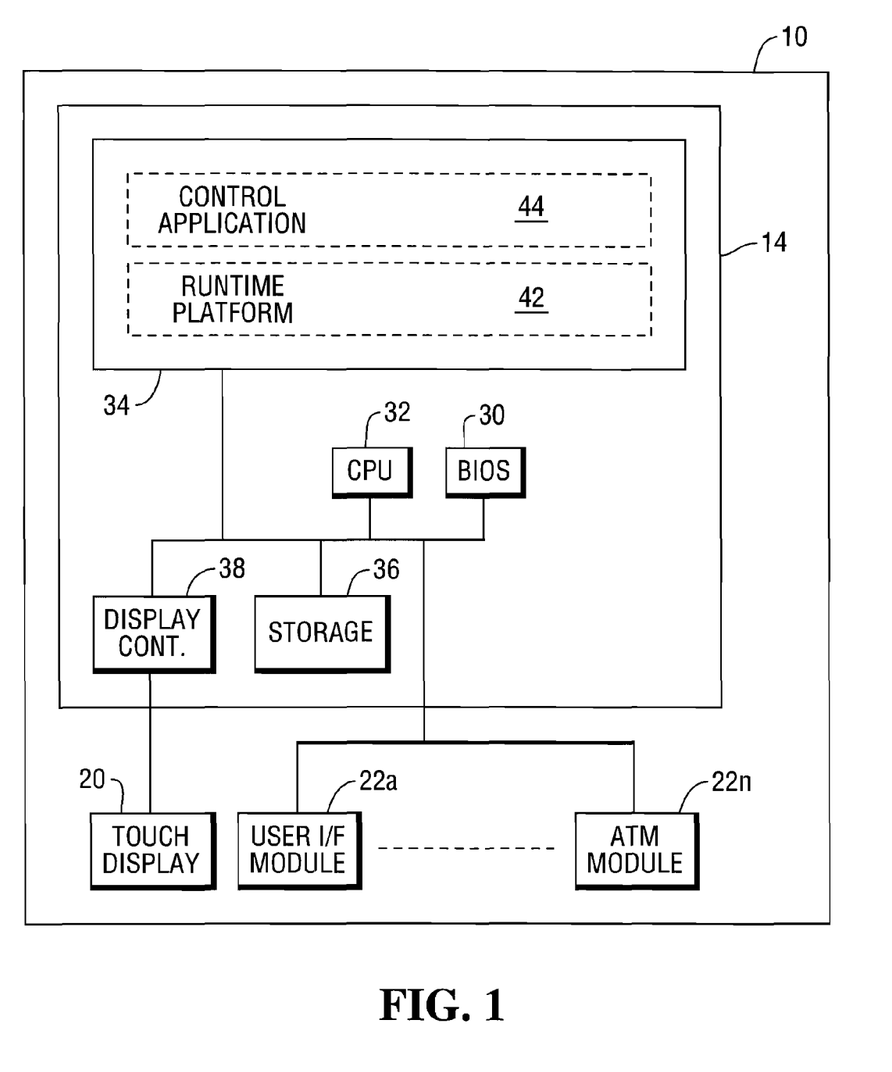
FIG. 1 is a simplified, schematic diagram of a self-service terminal (SST) according to one embodiment of the present invention.

Reference is first made to FIG. 1, which is a simplified, schematic diagram of a self-service terminal (SST) 10, in the form of an automated teller machine (ATM), according to one embodiment of the present invention.

The ATM 10 comprises a plurality of modules for enabling transactions to be executed and recorded by the ATM 10. These ATM modules comprise: a controller module 14, a customer display module 20, and various other user interface modules and internal ATM modules (labeled 22a to 22n), which are not shown in detail.

The controller 14 comprises a BIOS 30 stored in non-volatile memory, a microprocessor 32, main memory 34, storage 36 in the form of a magnetic disk drive, and a display controller 38 in the form of a graphics card for controlling the customer display module 20.

When the ATM is powered up, the main memory 34 is loaded with an ATM runtime platform 42 and a control application 44, both of which are stored on the magnetic disk drive 36.

The ATM runtime platform 42 includes: (i) components from a conventional operating system (in this embodiment, Windows XP (trademark), available from Microsoft Corporation (trade mark)), and (ii) proprietary components.

As is known in the art, the control application 44 presents a sequence of screens on the ATM display module 20 to a customer at the ATM, collates information from the customer (for example, customer account information from a customer's ATM card, transaction request, transaction amount, and the like), obtains authorization for a transaction request from a remote authorization server (not shown), and instructs modules within the ATM 10, as needed, to fulfill an authorized transaction.

Figure 2:
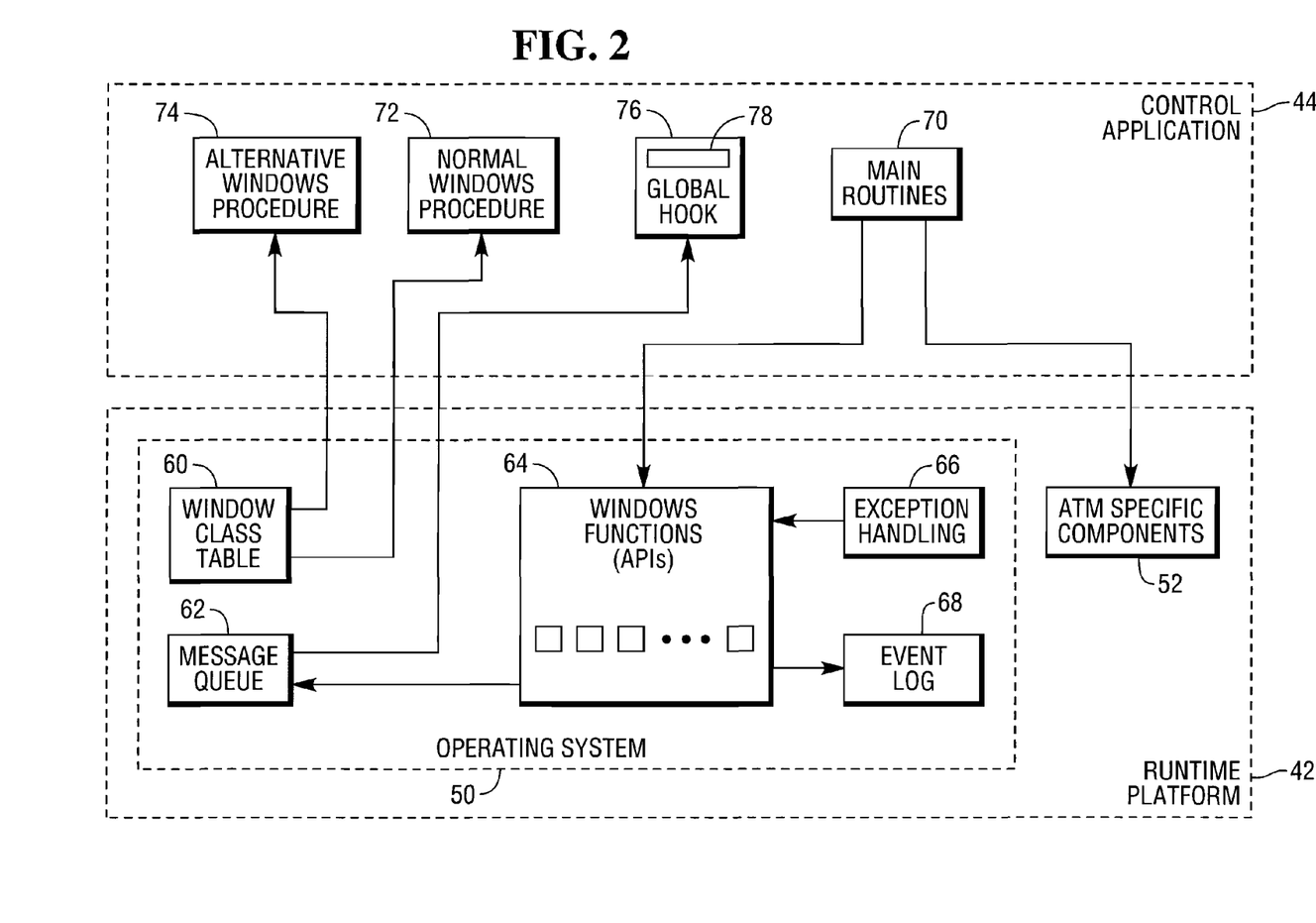
FIG. 2 is a simplified diagram illustrating interaction between software components within a memory of the SST of FIG. 1.

Reference will now also be made to FIG. 2, which is a simplified block diagram illustrating components within the runtime platform 42 interacting with components in the control application 44.

The runtime platform 42 comprises a Windows NT (trade mark) operating system 50 supplemented by components 52 (services, drivers, and the like) specific to ATM modules (such as a cash dispenser, a card reader, and the like).

The Windows NT (trade mark) operating system 50 is a message-driven operating system and comprises, inter alia, a windows class table 60; a windows message queue 62; a set of functional components (APIs) 64 called by the control application 44 (and/or any other application executing on the ATM 10); exception handling routines 66, and an event log 68. Conventional APIs 64 include: CreateWindow, ShowWindow, GetMessage, DispatchMessage, DefWindowPrc, RegisterClass, and the like.

The operation of the windows class table 60, the windows message queue 62, and those APIs 64 that are related to messaging within the windows environment (for example, "GetMessage", "DispatchMessage", "CreateWindow", and the like), are well known to those of skill in the art, and are described in the prior art section of U.S. Pat. No. 5,574,854, assigned to Microsoft Corporation.

The control application 44 comprises, inter alia, main routines 70 for implementing the functions associated with the control application 44; a normal windows procedure 72 for executing instructions relating to windows created by the control application 44; an alternative windows procedure 74 for replacing the normal windows procedure 72 when a window is to be suppressed (as will be described in more detail below); and a global hook component 76.

As is known to those of skill in the art, a global hook is a function created as part of a DLL or an application to monitor what the operating system is doing. A global hook is a function that is called every time a certain event in the operating system occurs.

In this embodiment, the global hook component 76 includes "WH_CallWndProc", which installs a hook procedure that monitors messages before the operating system 50 sends them to the destination window procedure (the normal window procedure 72, in this embodiment).

The global hook component 76 also includes a list 78 of titles and/or classes of windows that are to be blocked. This list is referred to herein as the block list 78.

It will be appreciated by those of skill in the art that FIG. 2 is greatly simplified, and only illustrates those components that are essential or useful for understanding this embodiment. Furthermore, some of these components have been simplified. For example, the normal windows procedure 72 would typically comprise a suite of windows procedures.

Figure 3:
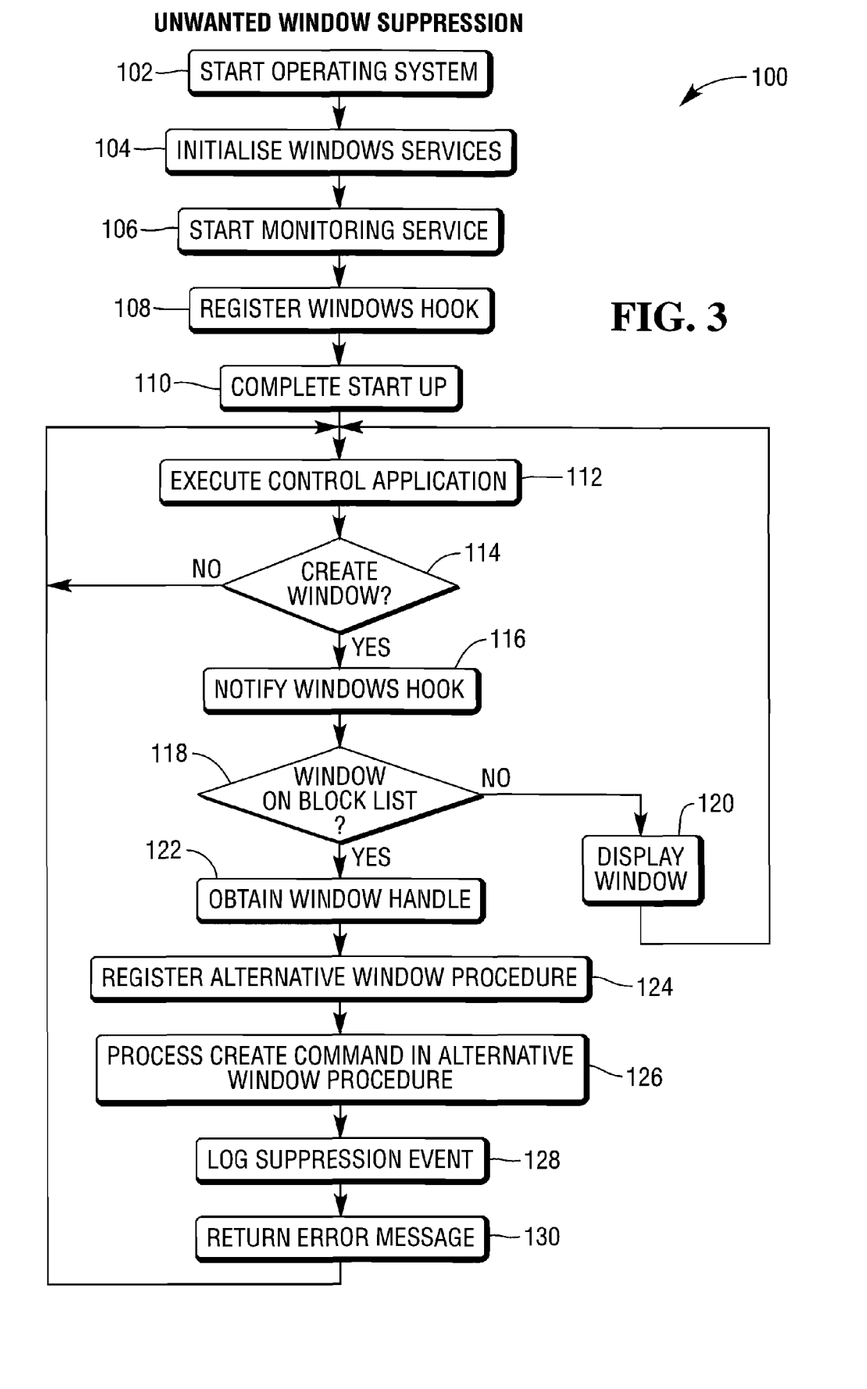
FIG. 3 is a flowchart illustrating steps performed by the software components of FIG. 2 in suppressing display of an unwanted window.

Reference will now also be made to FIG. 3, which is a flowchart 100 illustrating steps performed by the control application 44 and the operating system 50 in suppressing unwanted windows during execution of the control application 44.

Initially, when the ATM 10 is booted up, the operating system 50 is started (step 102), which causes the windows services (not shown) to be initialized (step 104). One of these services is a conventional monitoring service (not shown), which is started by the operating system 50 (step 106).

The global hook component 76 registers with the monitoring service (not shown) (step 108) so that the global hook component 76 will be notified of any messages sent to the message queue 62 by a windows function (one of the APIs 64, such as the CreateWindow API). Registration is implemented by using a standard API call (SetWindowsHookEx) including the CallWndProc hook procedure.

Once the monitoring service (not shown) has registered all relevant windows hooks (including global hook component 76) and performed other conventional tasks (not particularly relevant to this embodiment so not described herein) then the operating system start-up is complete (step 110).

The control application 44 is then executed within the environment of the operating system 50 (step 112).

As part of the normal operation of the control application 44, the control application 44 will request the operating system 50 to create a window for presenting on the customer display module 20 (step 114). This is implemented by the control application 44 calling a CreateWindow API (one of the APIs 64).

When the operating system 50 is about to create a window, it first sends a WM_CREATE message to the message queue 62, where the WM_CREATE message includes parameters for the window (window class, title, and the like). When this WM_CREATE message is received in the message queue 62, the operating system 50 notifies the global hook component 76 (step 116) about this message, including the window parameters.

The global hook component 76 compares the title and/or class of this window that is to be created (from the window parameters) with the windows titles and classes recorded in the block list 78 (step 118).

If there is no match, then the window is not blocked and the Dispatch Message API (one of the APIs 64) is called to send the WM_CREATE message to the normal windows procedure 72 listed in the windows class table 60 for that window. The window is then presented on the customer display module 20 (step 120).

If there is a match at step 118, then the window to be created is to be blocked. This is implemented by the following steps.

The global hook component 76 receives from the operating system 50 a window handle for the window that is to be created (step 122). The window handle is the operating system's unique identifier for that window.

The global hook component 76 then uses the received window handle to register an alternative window procedure for the window that is to be created (step 124). This involves the global hook component 76 updating the windows class table 60 to replace the address of the normal window procedure 72 with an address for the alternative window procedure 74. This is implemented using a standard API call (the SetWindowLong function) populated with a window handle associated with the window to be created, a GWL_WNDPROC attribute (which indicates that the address for the window procedure is to be changed) and a pointer to the alternative window procedure (that is, the address of the alternative window procedure).

The Dispatch Message API (one of the APIs 64) is then called to send the WM_CREATE message to the alternative windows procedure 74, which is now listed in the windows class table 60 for that window.

The alternative windows procedure 74 then processes the WM_CREATE message (step 126), which involves logging the message and parameters of the (to be suppressed) window to be created to the operating system event log 68 (step 128). This is implemented using the LogEvent( ) method.

Processing the WM_CREATE message also involves returning an error message to the operating system 50 (step 130). This is implemented by returning a negative value, such as "−1".

When the operating system 50 receives a negative value, then it destroys the window that was to be created. Applicant believes that this is implemented by the operating system 50 using the WM_DESTROY command. Thus, the window is never presented on the customer display module 20, so that the window has been suppressed.

The control application 44 may then continue to execute. Alternatively, the alternative windows procedure 74 may initiate an operating system re-boot when it processes the WM_CREATE message.

During execution of the control application 44, it is possible that an unhandled exception may be triggered by the control application 44 or by another application executing on the operating system 50, or by the operating system 50 itself.

Figure 4:
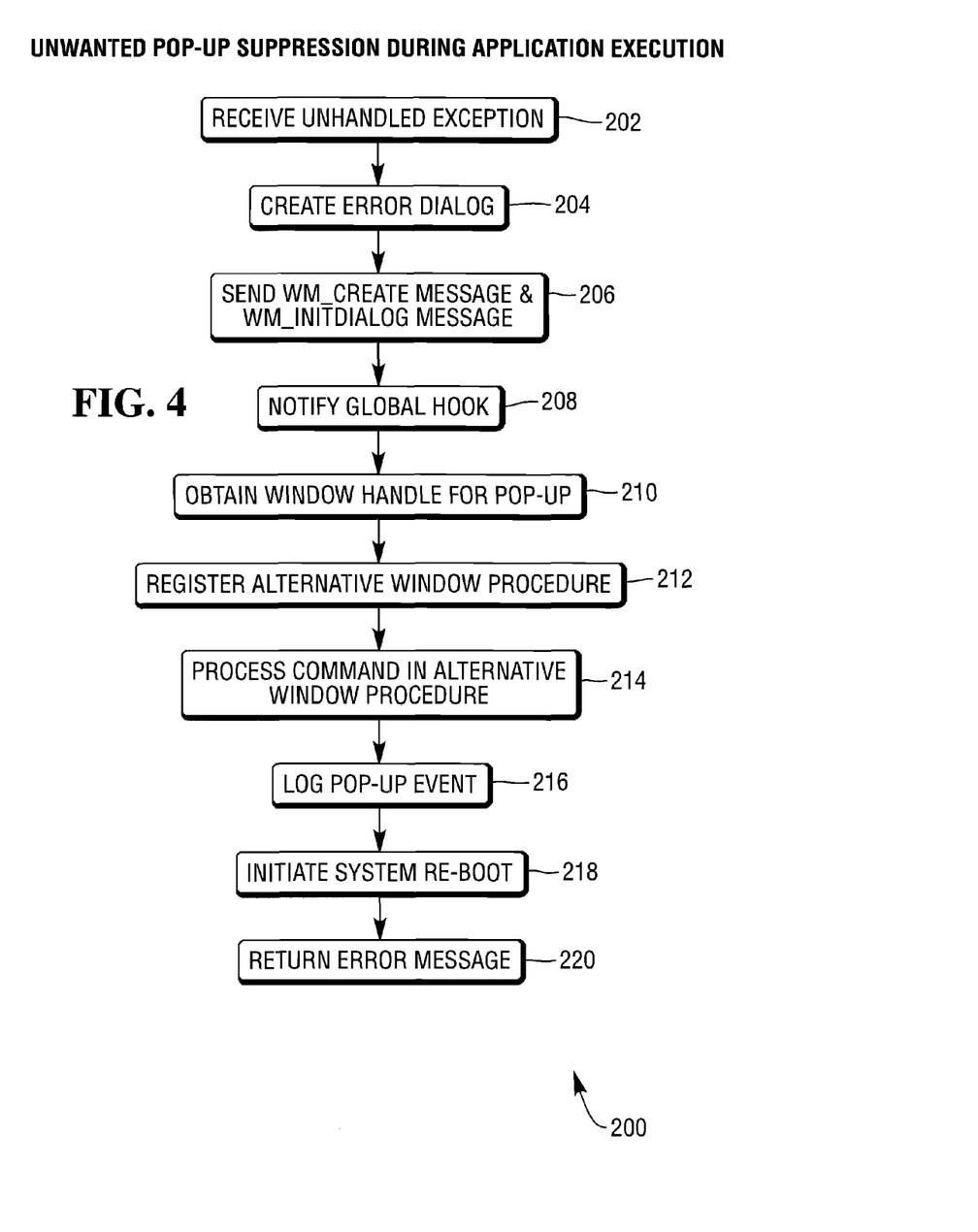
FIG. 4 is a flowchart illustrating steps performed by the software components of FIG. 2 in suppressing display of an unwanted dialog box.

Reference will now be made to FIG. 4, which is a flowchart 200 illustrating steps performed by the control application 44 and the operating system 50 in suppressing display of an unwanted dialog box during execution of the control application 44.

While the control application 44 is executing, the operating system 50 receives an unhandled exception (step 202).

In response to this, the operating system 50 creates an error dialog relating to the type of exception received (step 204).

The operating system 50 then creates a dialog box, resulting in the WM_INITDIALOG message and the WM_CREATE message being sent to the message queue 62 (step 206).

When these WM_INITDIALOG and WM_CREATE messages are received in the message queue 62, the operating system 50 notifies the global hook component 76 (step 208) about these messages, indicating creation of the error dialog.

The global hook component 76 receives a window handle for the dialog box that is to be created (step 210).

The global hook component 76 then uses the retrieved window handle to register an alternative window procedure for the dialog box that is to be created (step 212). This involves the global hook component 76 updating the windows class table 60 to replace the address of the normal window procedure 72 with an address for the alternative window procedure 74. This is implemented using a standard API call (the SetWindowLong function) populated with a window handle associated with the dialog box to be created, a GWL_WNDPROC attribute (which indicates that the address for the window procedure is to be changed) and a pointer to the alternative window procedure (that is, the address of the alternative window procedure).

The operating system 50 then calls the Dispatch Message API (one of the APIs 64) to send the WM_INITDIALOG message to the alternative windows procedure 74, which is now listed in the windows class table 60 for that dialog box.

The alternative windows procedure 74 then processes the WM_INITDIALOG message (step 214), which involves logging the message and error dialog for the dialog box that is to be created (which will actually be suppressed rather than created) to the operating system event log 68 (step 216). This is implemented using the Log Event( ) method.

Processing the WM_INITDIALOG message also involves the alternative windows procedure 74 initiating an operating system re-boot (step 218), or alternatively, a system shut-down without re-booting.

Once the operating system re-boot (or alternatively, the shut-down) has been initiated, the alternative windows procedure 74 returns an error message to the operating system 50 (step 220). This is implemented by returning a negative value, such as "−1".

When the operating system 50 receives a negative value, then it destroys the dialog box that was to be created. Applicant believes that this is implemented by the operating system 50 using the WM_DESTROY command. Thus, the dialog box is never presented on the customer display module 20, so that the dialog box (the pop-up) has been suppressed.

It will now be appreciated that the above embodiment has the advantage that unwanted windows (including unwanted pop-up dialog boxes) can be suppressed so that a customer never sees these unwanted windows or dialog boxes on a customer display module.

Various modifications may be made to the above described embodiment within the scope of the invention, for example, the other message-driven operating systems may be used than those provided by Microsoft Corporation; however, the specific calls and messages used may need to be changed.

A self-service terminal other than an ATM may be used, for example, a self-check-in or self-check-out terminal.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

What is claimed is:

1. A method of suppressing unwanted windows created by an operating system within a self-service terminal, the method comprising:
   (i) monitoring calls from the operating system relating to creation of a window before the operating system can send a monitored call to a window messaging queue for handling;
   (ii) ascertaining if the monitored call relates to creation of a window of a type corresponding to a window type listed as blocked;
   (iii) displaying the window in the event that the monitored call does not relate to a window of a type corresponding to a window type listed as blocked; and
   (iv) if the monitored call does not relate to a window of a type corresponding to a window type listed as blocked then
      (a) registering a new window procedure for that window by updating a class table for the operating system to replace an operating system procedure for processing that window with a new address for the new window procedure; and
      (b) returning an error message to the operating system using the new window procedure to suppress display of the window.

2. A method according to claim 1, wherein the method further comprises in step (iv) the step of adding an entry to an operating system event log to indicate that a window has been suppressed prior to returning an error message to the operating system.

3. A method according to claim 2, wherein the step of adding an entry to an operating system event log to indicate that a window has been suppressed may including storing information relating to (x) a title of the window that was suppressed, and (y) any text that was to be displayed in the suppressed window.

4. A method according to claim 1, wherein the method further comprises in step (iv) the step of initiating a closure instruction for the operating system prior to returning an error message to the operating system.

5. A method according to claim 4, wherein the step of initiating a closure instruction for the operating system comprises: initiating a shut-down of the operating system or initiating a re-boot of the operating system.

6. A method according to claim 1, wherein the step of monitoring calls from the operating system relating to creation of a window involves using a monitoring service to register a global hook arranged to monitor calls relating to creation of a window using a Microsoft™ Windows API WM_CREATE message.

7. A method according to claim 1, wherein the step of returning an error message to the operating system using the new procedure to suppress display of the window is implemented by the new procedure returning a negative value to indicate to the operating system that an error has occurred.

8. A method according to claim 1, wherein the step of ascertaining if a monitored call relates to creation of a window of a type corresponding to a window type listed as blocked involves:
 (a) inspecting a title and/or a class associated with that window and comparing the inspected title and/or class with stored titles and/or classes that are to be blocked, where the window is to be created using a Microsoft™ Windows API WM_CREATE message; and
 (b) classifying the monitored call as relating to creation of a window of a type corresponding to a window type listed as blocked, where the window is to be created using a Microsoft™ Windows API WM_INITDIALOG message.

9. A method according to claim 1, wherein the step of registering a new window procedure for that window may include updating a window class table with a pointer to an address at which the new window procedure can be accessed.

10. A self-service terminal comprising: a display; a processor; and a storage device operable to store instructions that, when executed by the processor, implement the method of claim 1.

11. One or more non-transitory digital storage media storing instructions which, when executed by one or more computing devices, cause performance of the method recited in claim 1.

12. A self-service terminal comprising:
 a memory including a computer program stored therein; and
 a microprocessor in communication with the memory and adapted to execute the computer program which when executed by the microprocessor causes the microprocessor to perform the steps of:
  monitoring calls from the operating system relating to creation of a window before the operating system can send one of the monitored calls to a messaging queue for handling; and
  determining that the one of the monitored calls relates to a first window of a type corresponding to a window type to be blocked and perform the steps of:
   registering a new window procedure for the first window by updating a class table for the operating system to replace an operating system procedure for processing the first window with a new address for the new window procedure;
   returning from the new window procedure an error message to the operating system to suppress display of the first window; and
  displaying the first window in the event that the monitored call does not relate to the window of the type corresponding to the window type listed as blocked.

13. The self-service terminal of claim 12, wherein the determining step further includes: sending a closure instruction to the operating system prior to returning an error message to the operating system.

14. The self-service terminal of claim 12, wherein the determining step further includes: adding an entry to an operating system event log to indicate that a window has been suppressed prior to returning an error message to the operating system.

15. The self-service terminal of claim 12, wherein a portion of the computer instructions that comprise the computer program are organized and stored according to the rules for a Microsoft™ dynamic link library module.

16. The self-service terminal of claim 12, where the self-service terminal is an automatic teller machine.

* * * * *